(12) United States Patent
McKelvey et al.

(10) Patent No.: US 8,228,575 B2
(45) Date of Patent: Jul. 24, 2012

(54) SYSTEM, METHOD, AND DEVICE FOR PRODUCING, TRANSMITTING AND DISPLAYING IMAGES IN HOLOGRAPHIC FORM OF UP TO THREE DIMENSIONS

(75) Inventors: Henry A. McKelvey, Capitol Heights, MD (US); Rosa M. Underwood, Washington, DC (US); Jimmie D. Peterman, Glenndale, MD (US); Emory L. Young, Reisterstownown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 436 days.

(21) Appl. No.: 12/561,815

(22) Filed: Sep. 17, 2009

(65) Prior Publication Data

US 2011/0063700 A1    Mar. 17, 2011

(51) Int. Cl.
*G03H 1/08* (2006.01)

(52) U.S. Cl. ............................................. 359/9; 977/742

(58) Field of Classification Search ................. 359/9, 21, 359/35; 977/742
See application file for complete search history.

(56) References Cited

U.S. PATENT DOCUMENTS

2006/0210279 A1* 9/2006 Hillis et al. ................... 398/118
* cited by examiner

*Primary Examiner* — Alessandro Amari

(57) ABSTRACT

A system, method, and device for producing, transmitting and displaying images in holographic form of up to three dimensions. Information representative of a three dimensional image can be converted into three-dimensional positional data. The three-dimensional position data can be converted into an electromagnetic field which can be received by nano-machines configured to adjust position in accordance with the electromagnetic field and including mirrored endpoints for reflecting light. The nanomachines can adjust position in three dimensions so that the mirrored endpoints reflect light in a manner that reproduces the three dimensional image in holographic form.

8 Claims, 11 Drawing Sheets

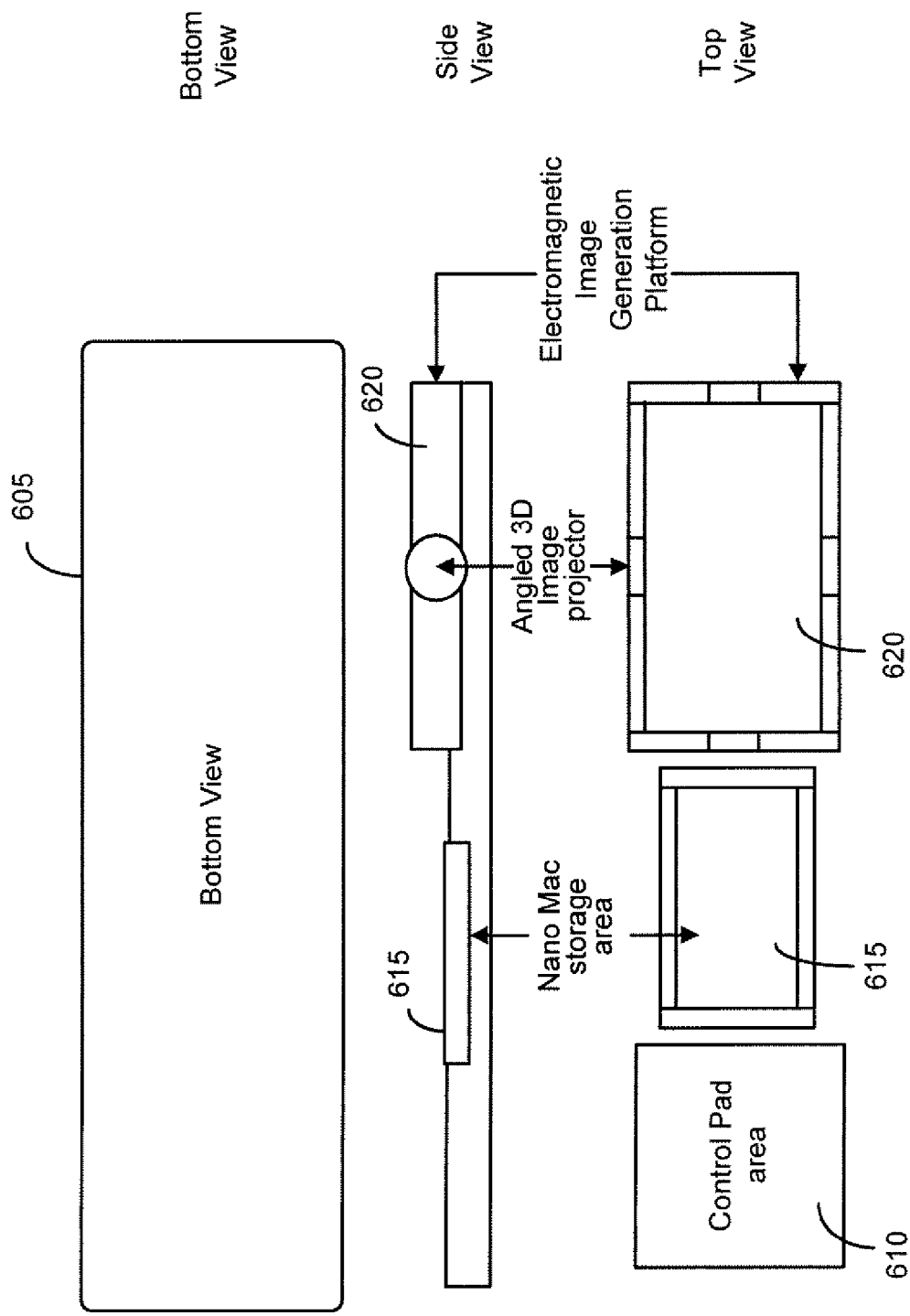

SYSTEM, METHOD, AND DEVICE FOR PRODUCING, TRANSMITTING AND DISPLAYING IMAGES IN HOLOGRAPHIC FORM OF UP TO THREE DIMENSIONS

BACKGROUND INFORMATION

Conventionally, real-time video communications is performed using a flat screen image display device or some other device configured to display two-dimensional video. Conventional video communications systems and devices are not able to transmit, receive, or display three-dimensional videos using holographic images.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 6 is a graphic depiction of a device configured to deliver the 3-D holographic form signal.

DETAILED DESCRIPTION OF PREFERRED EMBODIMENTS

Preferred embodiments provide for the use of nano-machines to produce, transmit, and receive images in holographic form of up to three dimensions to provide the consumer with an 'in person' experience.

The nanomachines may receive instructions in the form of Quantum Bit ("Q-bit") words, which may be a quantum superposition of the normal binary bit. This usage allows for the delivery of vector information. The nanomachines are RF or optically responsive to allow them to take form with the use of radio waves or optical energy. The communication is essentially a simple positional reference that follows the course of the formation wave (i.e. signal that the nanomachines line up on) derived from the use of the vector information.

The command structure allows for the positioning of the nano-machine and its mirrored back to reflect light at a particular angle. The commands that the nano-machine may have to interpret are up, down, left, and right. Using the vector information supplied by the Q-bit, it is possible to add depth to the simple commands by issuing longitude, latitude, and magnitude information thus making the nano-machine capable of moving along the X axis, Y axis, and Z axis.

Hence the command structure may be represented by a series of relational coordinates along the needed axes and structured in the following fashion: (direction:degree) (1:0.0), (0:0), (00:0), (11:0). By varying the directional coordinates a nanomachine may be directed to a defined spot on the form generated by the vector data in conjunction with the device creating the form.

An image that is to be represented may be scanned, and vector data may be determined. The vector data may then be transmitted to a receiving device. Once transmitted, the receiving device may interpret the vector information so that the image can be reconstructed in a three-dimensional, holographic form.

Holographic images may be formed using nano machines as the mirrored surface which is needed to form the holographic image. Mirror adjustment is achieved by using vector data resulting in light shown on a reflective surface producing a three dimensional holographic effect.

Figure 1A:
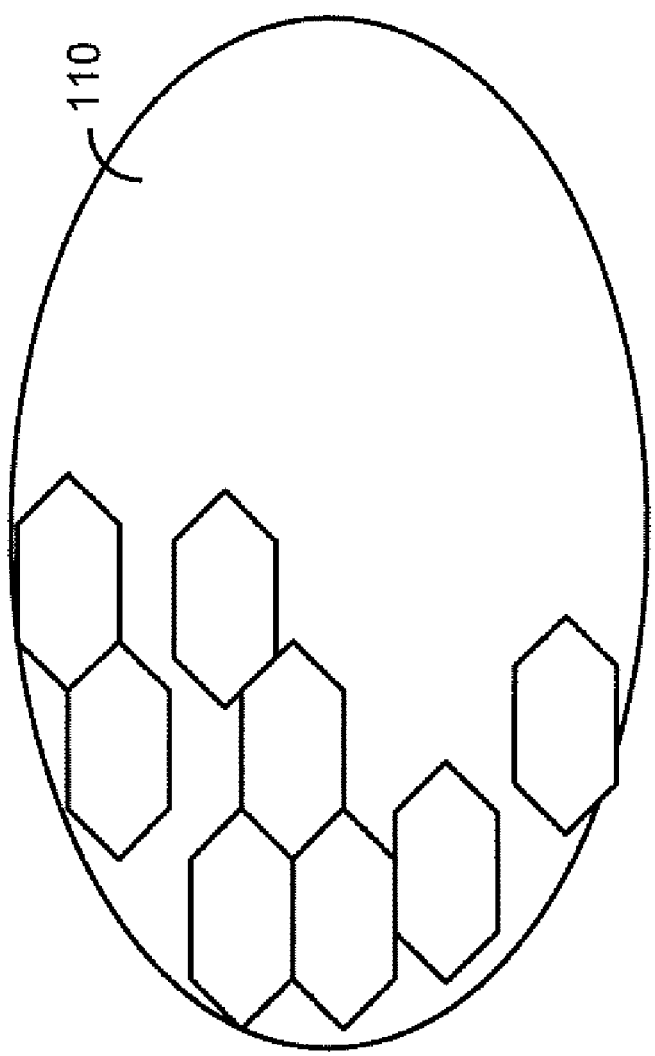
FIG. 1(a) is a depiction of a plurality of nanomachines distributed on an electromagnetic field.
Figure 1A:
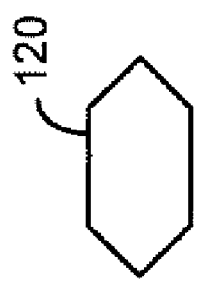

FIG. 1(a) depicts multiple nanomachines 120 distributed on an electromagnetic field 110.

Figure 1B:
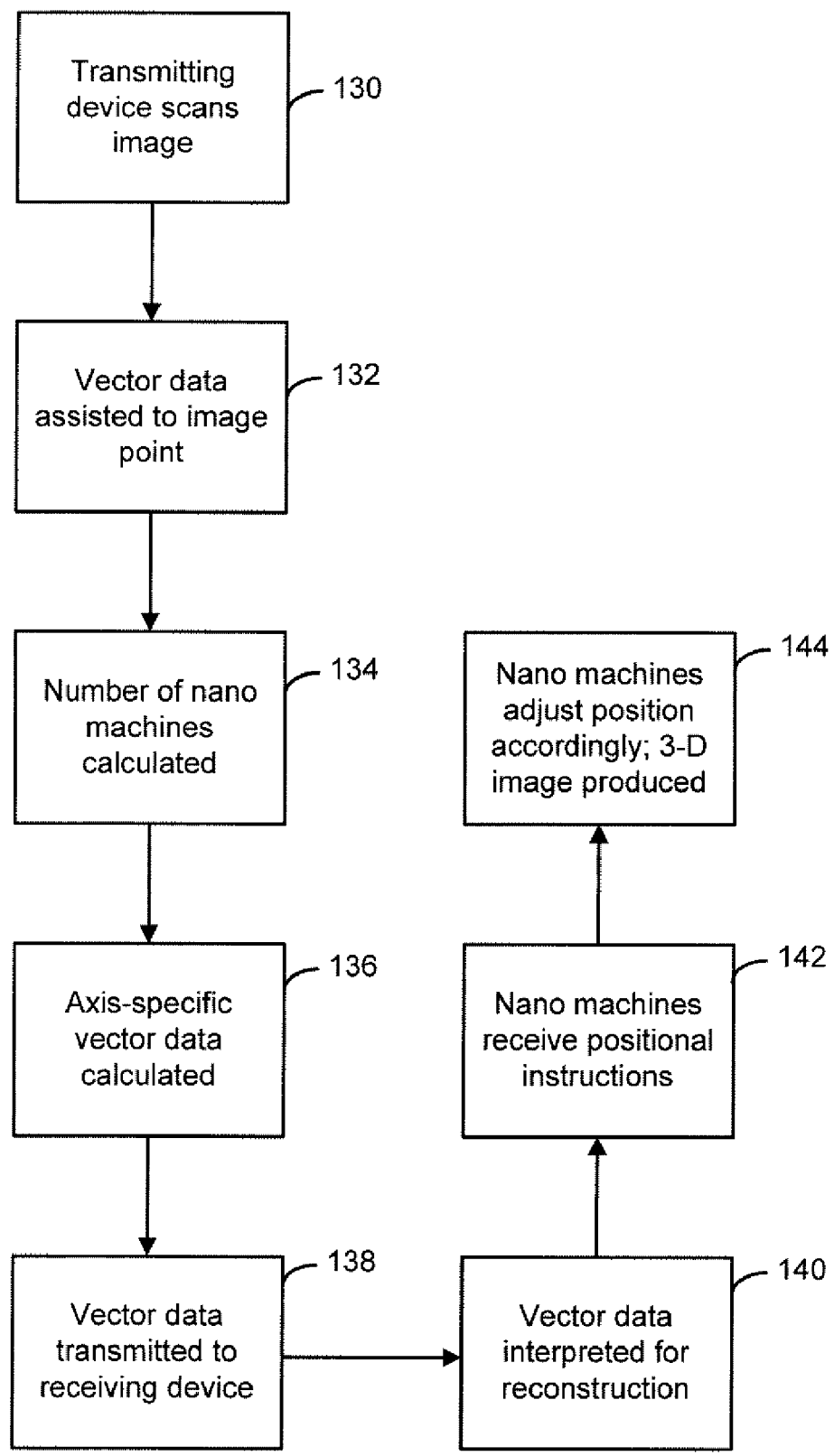
FIG. 1(b) is a flowchart illustrating steps for producing, transmitting, and displaying images in holographic form of up to three dimensions in accordance with exemplary embodiment.

FIG. 1(b) is a flowchart illustrating steps for producing, transmitting, and displaying images in holographic form of up to three dimensions in accordance with exemplary embodiments. As illustrated in blocks 130, 132, and 134, when a transmitting device first scans an image it may assign vector data to the image points and it may then calculate how many nanomachines may be needed to form the reflective form needed to create a holographic form. As illustrated in block 136, an algorithm may use this already-calculated information to create axis information that may become the basis for vector data, which may then be transmitted to a receiving device as illustrated in block 138. As shown in block 140, the receiving device may use an internal algorithm engine to interpret the transmitted vector information by reconstructing the original data and applying it to the formation of the intended 3-D image. Thus, the vector data may be interpreted via the use of algorithms at the transmitter and at the receiver.

At block 142, nanomachines may receive instructions from the receiver indicating a three-dimensional positional reference. The positional reference may also include an angle of tilt for the mirror portion of the nanomachine. The angle of tilt may allow the nanomachine to reflect light at a given angle. These instructions may be in the form of Q-bit words. The instructions received by the nanomachines may impart a particular flux index on the nanomachine which may determine the three-dimensional position data of the nanomachine. In other words, the three-dimensional positional data of the nanomachines and the angle of the mirror may be tracked using a flux index value. The one or more nanomachines, as illustrated in block 144, may adjust accordingly to produce a reflective holographic form.

Figure 2A:
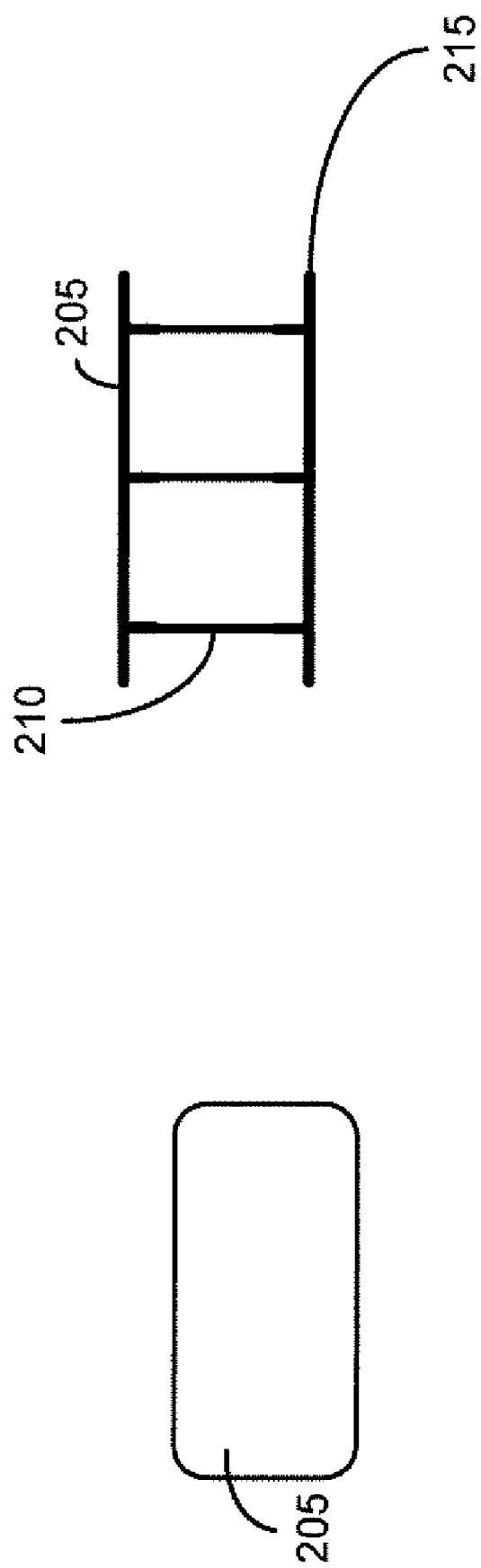
FIG. 2(a) illustrates the formation of a nanomachine using nanotube technology utilizing doped carbon tubes with iron based nano powder.

FIG. 2(a) illustrates the formation of a nanomachine using nanotube technology utilizing doped carbon tubes with iron based nano powder.

The nanomachine may include a mirrored surface 205. Mirrored surface 205 may reflect a degree of light.

The nanomachine may include a nanotube sheet base 215. The mirrored surface 205 and the nanotube sheet base 215 may be connected by nanotubes 210. By way of non-limiting example, mirrored surface 205 and sheet base 215 may be connected by nine nanotubes. The center nanotube may serve as a pivot point, and, as such, it may only expand and not contract. The remaining nanotubes may be configured to expand and contract.

Nanotubes 210 may be lightly doped carbon nanotubes. Nanotubes 210 may be controlled and aligned using a magnetic field through the use of a metallic powder (nano powder). The nanotubes 210 may be single-walled graphite. Such carbon nanotubes may have a diameter of about one nanometer, with a tube length that may be substantially greater than the diameter. In some embodiments, multiple-walled carbon nanotubes may be utilized. A multi-walled nanotube includes a graphite layer rolled to form a tube that has multiple layers. Carbon nanotubes are described by way of non-limiting example. Nanotubes useful for the disclosed apparatus, system, and methods may be prepared using any material known to be useful for conducting electricity.

Nanopowder may be used to dope the intrinsic carbon nanotubes and make the tubes susceptible to control via a magnetic field. The alignment may be done in 3-D by using a Q-bit. A Q-bit is a unit of quantum information. A Q-bit is similar to a classical bit in that both can have two possible values, namely, 0 or 1. The difference is that a classical bit must be 0 or 1, but a Q-bit can be 0, 1, or a quantum superposition of both.

As a result, a Q-bit may be used in the realization of a 3-D representation of a 2-D concept. In other words, the nano tubes can be structured to respond to not only 1's and 0's but the superposition of the two digits. This may allow the nanotubes to be aligned such that they are attracted to their exact polar opposite as it may exist in a 3-D structure. Thus, rather than controlling the nanotubes only on an X-axis and a Y-axis, the nanotubes are allowed to have their own magnetic field. The nanotube in question would thus have a field added or subtracted from it that allows for a direct correlation to its polar opposite, which may cause an automatic attraction to that point.

Figure 2B:
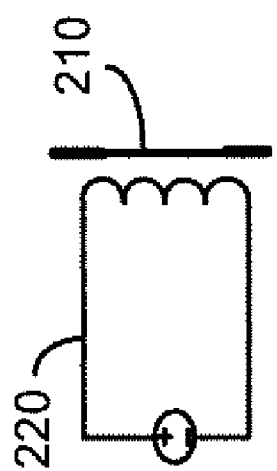
FIG. 2(b) is a depiction of a DC magnetic field inducer magnetizing a doped nanotube.

FIG. 2(b) is a depiction of a DC magnetic field inducer magnetizing a doped nanotube. DC magnetic field inducer 220 may magnetize the doped nanotubes and allow the tube to contract or expand to position the mirror 205 according to the flux value needed to provide proper positioning of the mirror surface. As stated above, a center nanotube may be configured as a pivot and may only expand and not contract.

Figure 2C:
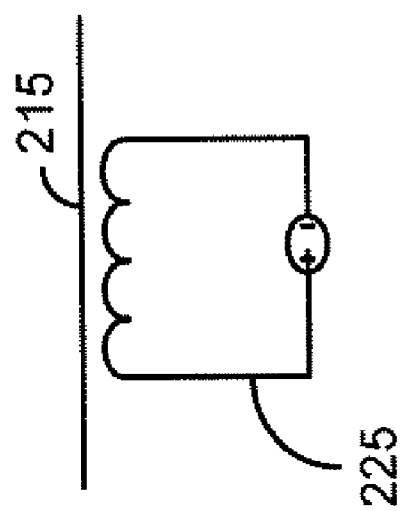
FIG. 2(c) is a depiction of a DC magnetic field inducer magnetizing a heavily doped base.

FIG. 2(c) is a depiction of a DC magnetic field inducer magnetizing a heavily doped base. The nanotube sheet base 215 may be a woven base and may be heavily doped. A heavily doped sheet base may allow induced magnetism to encode a positional flux value to it. This may provide the nano machine with the ability to track its polar opposite and be drawn to that location.

DC magnetic field inducer 225 may magnetize the heavily doped base 215 with flux value that will allow for the nano machine to track its position, which may be the polar opposite to the flux value. The nanocomposite materials useful for the apparatus and methods of the disclosure may be anisotropic due to the alignment of the nanotubes. Nanotubes may be dispersed or aligned by any method known for preparing such materials. For example, the nanotubes may be fixed with a magnetic element and then dispersed within a liquid or highly plastic base material. The base material may then be subjected to a magnetic field to align the nanotubes and then curing the base material to maintain the alignment of the nanotubes.

FIGS. 3(a), 3(b), 4(a), and 4(b) are block diagrams illustrating the components and procedures for transmitting and receiving nanomachine instructions.

To realize the communication process, it must be understood that nano-technology is on the order of an atom or small grouping of atoms. Communications with nano-technology may utilize simple commands either delivered in the infrared or RF energy spectrum. Additionally, the individual nanomachine may have to have a simple instruction set (i.e. up, down, left, and right). The use of distributed processing may allow for a well-defined control of movement within designated parameters.

Figure 3A:
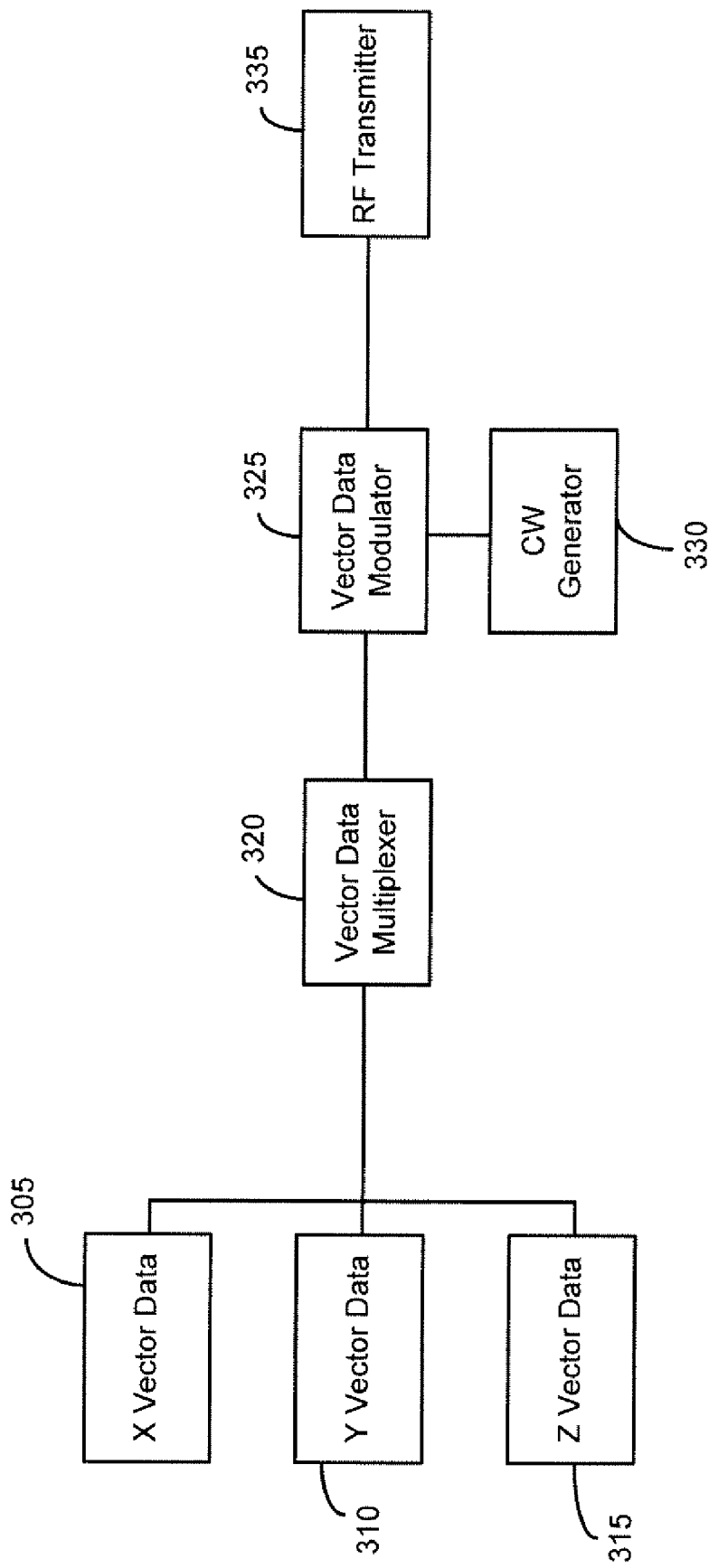
FIG. 3(a) is a block diagram illustrating a system and method for communicating instructions from a transmitting device, via RF transmission, to a nanomachine.
Figure 3B:
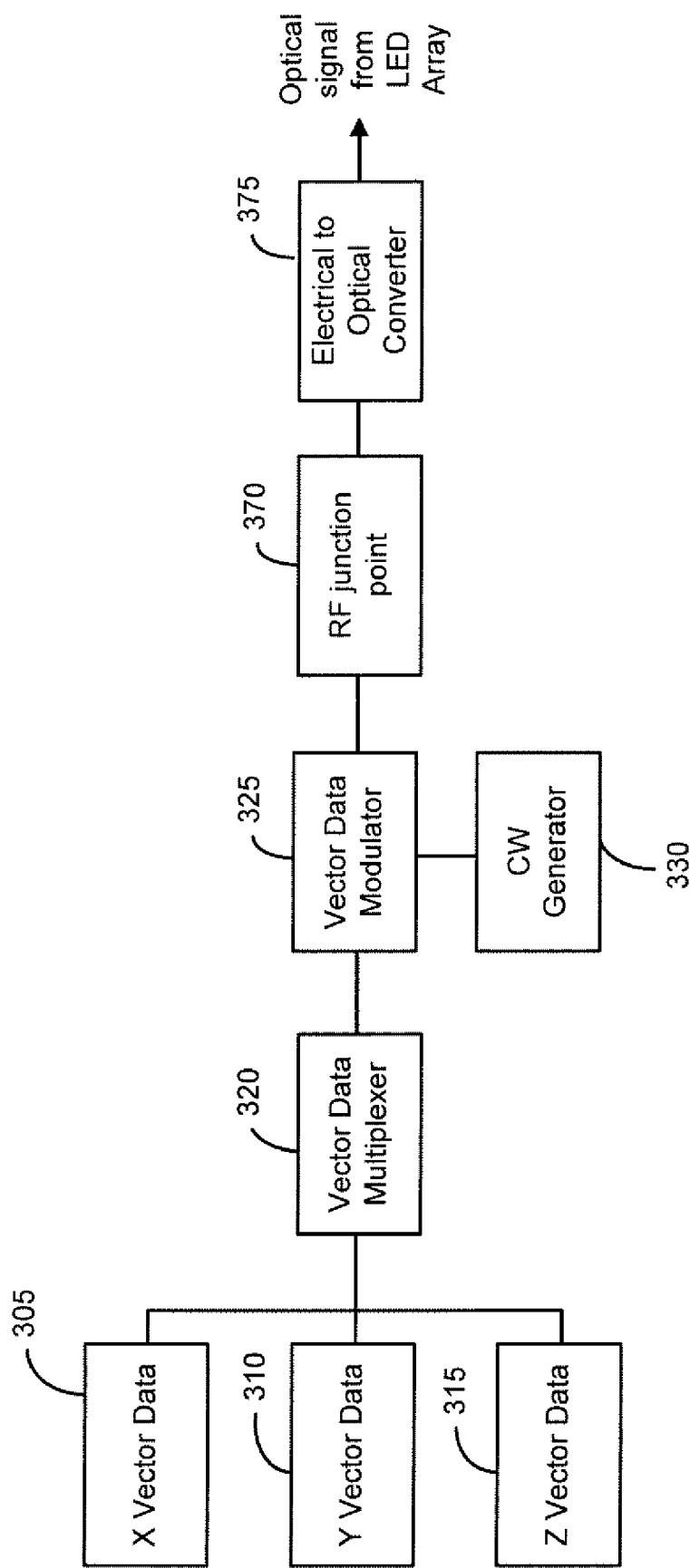
FIG. 3(b) is a block diagram illustrating a system and method for communicating instructions from a transmitting device, via optical transmission, to a nanomachine.

FIG. 3(a) is a block diagram illustrating a system and method for communicating instructions from a transmitting device, via RF transmission, to a nanomachine. An imaging device configured to create 3-D images may scan an object or scene that is to be represented as a hologram. The imaging device may create X, Y, and Z vector data. The X, Y, and Z vector data—which are illustrated in blocks 305, 310, and 315, respectively—may represent the positional coordinate data needed to reproduce the scanned image. Vector data multiplexer 320 may multiplex the X vector data 305, Y vector data 310, and Z vector data 315 to create multiplexed X, Y, and Z vector data. Vector data modulator 325 may modulate the vector data onto a carrier wave, which may be generated by carrier wave generator 330. RF transmitter 335 may then transmit the carrier wave containing the modulated vector data to a RF receiver FIG. 3(b) is a diagram illustrating a system and method for communicating instructions from a transmitting device, via optical transmission, to a nanomachine. FIG. 3(b) differs from FIG. 3(a) only in that the vector data is being transmitted optically rather than by RF transmission. To facilitate the optical transmission, RF junction point 340 may remove harmonics from an RF signal. Electrical to optical converter 345 may then convert the RF signal into an optical signal. The optical signal may then be sent via an individual LED or Laser, or via an LED array.

Figure 4A:
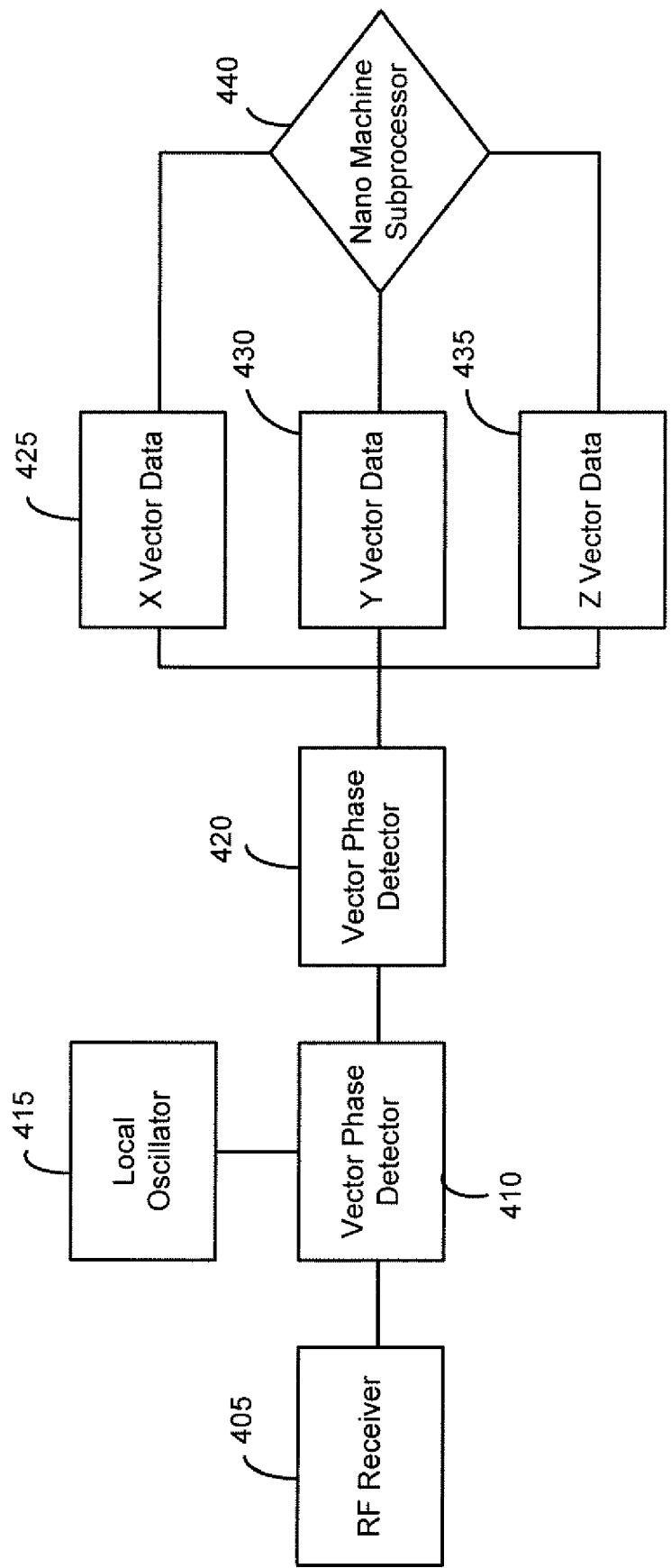
FIG. 4(a) is a block diagram illustrating a receiving device for receiving vector data information data transmitted via an RF signal.

FIG. 4(a) is a block diagram illustrating a receiving device for receiving vector data information data transmitted via an RF signal. RF receiver 405 may receive a transmitted RF signal containing vector data representations of nanomachine instructions. RF receiver 405, by way of non-limiting example, be an antenna device. Vector phase detector 410 may receive the RF signal along with a signal produced by local oscillator 415 and may detect the phase of the received RF signal. The phase detection step allows for the algebraic expression of the X, Y, and Z signals to be extracted from the RF signal. The algebraic expression is useful in that it represents the multiplexed signal, which can then be demultiplexed. Vector data multiplexer 420 may demultiplex the phase-detected signal into X, Y, and Z vector data. Blocks 425, 430, and 435 may be signal amplifiers for the X, Y, and Z vector data, which may correspond to X, Y, and Z vector data 305, 310, and 315 created by an imaging device and discussed above with respect to FIG. 3(a) and FIG. 3(b)

Nanomachine subprocessor 440 may include a nanomachine control algorithm engine. This nanomachine control algorithm engine may be a software device that may assign a nanomachine to a particular vector point using the responsive architecture of the nanomachine. The nanomachine subprocessor 440 may then convert the X, Y, and Z vector data into an electromagnetic field and deliver the vector positional data to the at least one nanomachine.

Once the nanomachines receive their location vectors they can then form on the pattern that is generated by the receiver device and thus would create a form. The vector may be checked for correctness and then instructions may be sent to the nanomachines to carry out the assigned positioning.

Figure 4B:
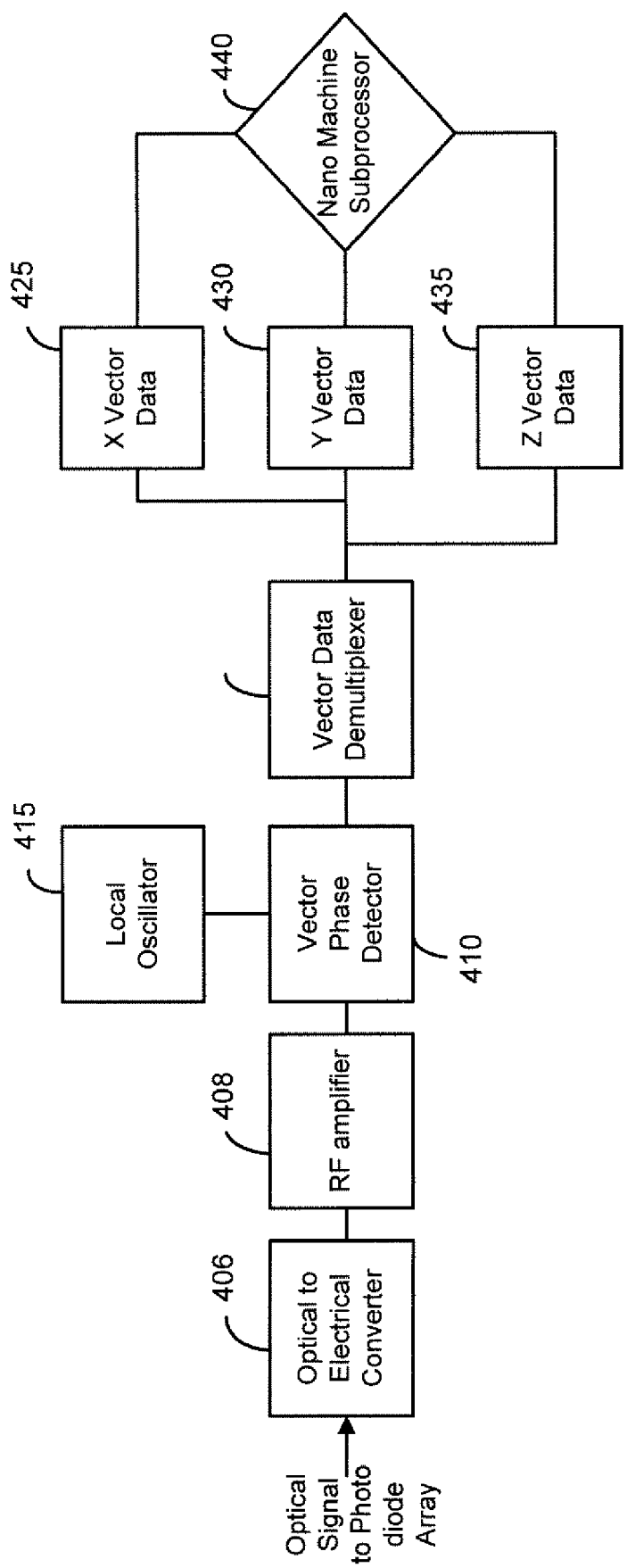
FIG. 4(b) is a block diagram illustrating a receiving device for receiving vector data information transmitted optically.

FIG. 4(b) is a block diagram illustrating a receiving device for receiving vector data information transmitted optically. FIG. 4(b) differs from FIG. 4(a) in that the modulated carrier wave is transmitted, and received optically, rather than by RF transmission. Optical to electrical converter 406 may convert the optical signal into an RF signal. RF amplifier 408 may remove any errors which may have occurred in the transition from the optical signal to electrical signal at Optical to electrical converter 406.

The nanomachine may be responsive to a Q-bit format. As previously described, Q-bits are units of quantum information that can be expressed as bits (0 or 1) or as a linear superposition of these states. For example, if a particle can be in position A and position B, it can also be in a state where it is an amount "4i/10" (Where i is a variable) in position A and an amount "9/10" in position B. Therefore, from this we can determine that A (0) and B (1) can have amplitude components (4i/10) and (9/10) (Where i is a variable).

If RF is used the nano-machine could be configured as a simple radio device which takes and moves the information according to the data sent to the nano-machine. With this method, the nanomachine should understand the RF information and be able to detect and demodulate the RF to interpret the command. Another embodiment which may be implemented with less complicated systems is to have the nanomachine developed with an RF responsive system. Meaning that when exposed to RF, the nanomachines take positions relative to the algebraic expression of the RF signal or an approximation of that signal. This being the case, it may be possible to generate an X, Y, and Z axis signal that the nanomachines form.

Figure 5:
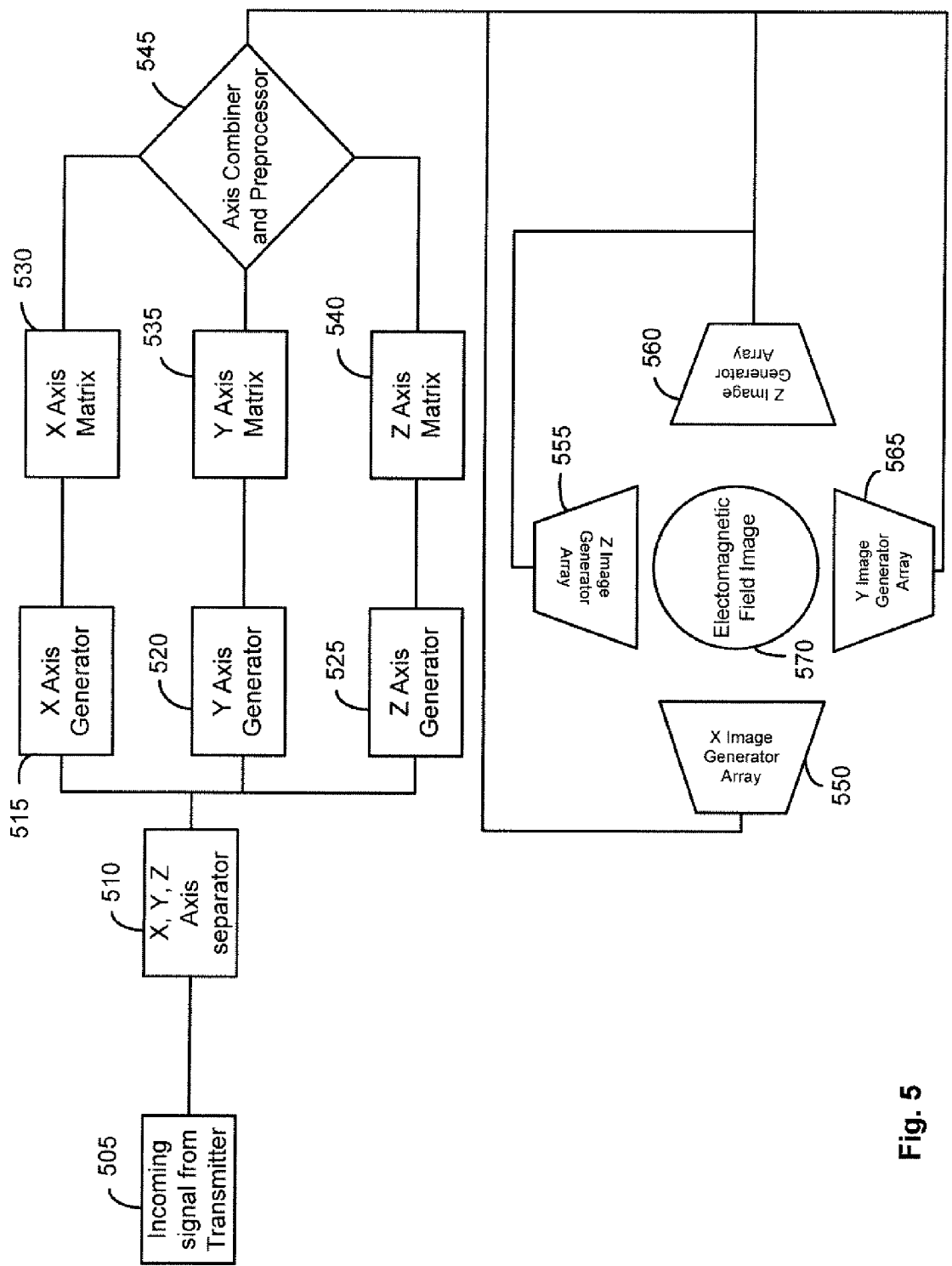
FIG. 5 is a block diagram depicting the creation of light reflecting form for use in a communications device.

FIG. 5 is a block diagram depicting the creation of light reflecting form for use in a communications device. After receiving the data from the transmitter, and the application of the data to the algorithm, the receiving device may then instruct the nanomachines where to go on the form created by the X, Y, and Z vectors. The form is electromagnetic in nature and will provide the needed platform from which the nanomachines can react and follow the preset positional data. The nanomachines will be able to know their proper destination position based on the data received from the transmitter. By using the vector data the nanomachines can configure themselves to the electromagnetic form.

An incoming signal from transmitter shown at block 505 is sent to X, Y, Z axis separator 510. The incoming signal from the transmitter may refer to energy from the display equipment itself (i.e. the equipment generating the electromagnetic platform). The X, Y, Z axis separator 510 may receive the incoming signal and may serve the purpose of only allowing the individual axis to exist in that generator. X, Y, and Z axis generator 515, 520, and 525 may perform a process called summing and filtering which may sum the various signals together and then filter the summed result so that only the desired signal remains.

X, Y, and Z axis matrices 530, 535, and 540 may create a smoother electromagnetic field and reduce the probability of attracted elements becoming grouped together in bunches. This phenomenon is sometimes referred to as "clustering" or "clumping." Axis combiner and preprocessor 545 may refer to an electromagnetic generator in the image array for the X and Y images. The axis combiner and preprocessor 545 may conver the X, Y, and Z data from the matrix into higher powered electrical signals that are then converted into electromagnetic waves by X, Y, and Z arrays. Axis combiner and preprocessor 545 may also serve as the point at which the X, Y, and Z signals are processed back to their algebraic equivalent for amplification and delivery to the array, which will create the 3-D magnetic field.

Electromagnetic field image 570 is the combination of an X and a Y axis image and two Z axes, one Z axis positioned opposite the X axis and another Z axis positioned opposite the Y axis. This configuration may allow for an additional degree of freedom a nanomachine may be positionally shifted.

FIG. 6 is a graphic depiction of a device configured to deliver the 3-D holographic signal. Control pad area 610, nanomachine storage area 615, and angled 3-D image projector 620 may work in conjunction with one another to produce a holographic image.

The control pad area 610 may be a control area for users to adjust various characteristics of the holographic image. Nanomachine storage area 615 may store inductors that may pre-position the mirrored endpoints of the nanomachines and create the field on the individual nanomachine platforms which is the polar opposite of the of the field corresponding to the appropriate position for the nanomachine. Angled 3-D image projector 620 may create an electromagnetic field that the nanomachines from the nanomachine storage area 615 may position themselves on when the electromagnetic image platform is activated.

The electromagnetic image generation platform may be a series of electromagnets or magnets controlled with an electrical field. Once turned on, it may create the actual electromagnetic form. Then after activation of the nanomachines, the nanomachines may then be released into the field. The nanomachines may be drawn to their polar opposite charge, which is the proper position to reflect light and allow for the display of a three dimensional image. The actual image may then be projected on to the nanomachine and then this may create the optical image being viewed.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
   receiving information representative of an image;
   calculating vector points representative of points on the image;
   calculating information indicative of the quantity of nanomachines needed to create a holographic representation of the image;
   calculating axis-specific vector data; and
   transmitting vector data and nanomachine instruction data to a display device,
   wherein an electromagnetic field is generated from the transmitted vector and nanomachine instruction data.

2. The method according to claim 1, wherein the electromagnetic field causes the at least one nanomachine to adjust its position.

3. The method according to claim 2, wherein the at least one nanomachine is configured to adjust its position in three dimensions.

4. The method according to claim 1, wherein the vector data is represented in the form of Q-bits.

5. The method according to claim 1, wherein the vector data is transmitted via an RF signal.

6. The method according to claim 1, wherein the vector data is transmitted optically.

7. A computer readable media comprising code to perform the acts of the method of claim 1.

8. A system, comprising:
a device including an processor for processing computer readable data, the device configured to:
receive electronic information representative of an image;
calculate vector points representative of points on the image;
calculate the number of nanomachines needed to create a hologram representative of the image;
calculate axis-specific vector data; and
transmit vector data and nanomachine instruction data to a display device,
wherein an electromagnetic field is generated from the transmitted vector and nanomachine instruction data.

* * * * *